US008092716B2

(12) United States Patent
Gary et al.

(10) Patent No.: US 8,092,716 B2
(45) Date of Patent: Jan. 10, 2012

(54) PROCESS FOR THE PREPARATION OF A CATALYTIC SPECIE USING ELECTRO-DEPOSITION

(75) Inventors: Daniel Gary, Montigny le Bretonneux (FR); Pascal Del-Gallo, Dourdan (FR); Francesco Basile, Catanzaro (IT); Angelo Vaccari, Bologna (IT); Giuseppe Fornasari, Bologna (IT); Valentina Rosetti, Modigliana (FC) (IT); Erika Scavetta, Bologna (IT); Domenica Tonelli, Bologna (IT)

(73) Assignee: L'Air Liquide Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 748 days.

(21) Appl. No.: 12/160,376
(22) PCT Filed: Jan. 10, 2007
(86) PCT No.: PCT/EP2007/050223
§ 371 (c)(1),
(2), (4) Date: Jul. 9, 2008
(87) PCT Pub. No.: WO2007/080175
PCT Pub. Date: Jul. 19, 2007

(65) Prior Publication Data
US 2011/0017953 A1    Jan. 27, 2011

(30) Foreign Application Priority Data
Jan. 12, 2006 (EP) .................................... 06300029

(51) Int. Cl.
*C05D 5/02* (2006.01)
*C01B 3/26* (2006.01)
(52) U.S. Cl. .......... 252/373; 205/80; 502/252; 502/257; 502/259; 502/261; 502/305; 502/306; 502/313; 502/314; 502/315; 502/316; 502/320; 502/326; 502/327; 502/328; 502/332; 502/335
(58) Field of Classification Search .................. 252/373; 502/527.24, 232, 252, 259, 261, 305, 306, 502/313, 314, 315, 316, 320, 326, 327, 328, 502/332, 335, 336, 337, 338; 205/80; 427/457
See application file for complete search history.

(56) References Cited

U.S. PATENT DOCUMENTS
3,719,739 A * 3/1973 Thompson ................. 423/213.5
(Continued)

FOREIGN PATENT DOCUMENTS
EP           1419814           5/2004
(Continued)

OTHER PUBLICATIONS
Dixit M. et al: "Electrosynthesis and Stabilization of Alpha-cobalt Hydroxide in the Presence of Trivalent Cations" Journal of Power Sources, Elsevier, Amsterdam, NL; vol. 56, No. 1, Jul. 1995, pp. 97-100, XP004044373, ISSN: 0378-7753.
(Continued)

*Primary Examiner* — Wayne Langel
(74) *Attorney, Agent, or Firm* — Elwood L. Haynes; Donna Blalock Holguin

(57) ABSTRACT
Process for the preparation of a catalytic specie consisting essentially of a metallic support, which is coated with a ceramic active phase layer, mainly compound of the general formula (I):

$$[Rh_xNi_yMg_{l'}Al_m(OH)_2]^{z+}(A^{n-}{}_{z/n})kH_2O, \quad (I)$$

wherein $A^{n-}$ is mainly a silicate or a polysilicate anion; $0 \leq x \leq 0.3$; $0 \leq y \leq 0.9$; $0 \leq l \leq 0.9$; $0 \leq m \leq 0.5$; $0 \leq k \leq 10$; $x+y>0$; $0.5 \leq y+l \leq 0.9$; $x+y+l+m=1$; and z is the total electrical charge of the cationic element or a compound of the general formula (II):

$$[A_zA'_{1-z}][B_{1-x-y}Ni_xRh_y]O_{3-\delta} \quad (II)$$

wherein A and A' are different and are selected from the Lanthanide or the Actinide families or from the group $II_a$ of the Mendeleev's periodical table of elements; B is selected from the transition metal groups of columns IIIb, IVb, Vb, VIb, VIIb, Ib and IIb and group VIIIb of the Mendeleev's periodical table of elements; $0 \leq x \leq 0.7$, $0 \leq y \leq 0.5$, $0 \leq x+y \leq 0.8$, $0 \leq z \leq 1$ and $\delta$ is the sub stoechiometric value of oxygen to obtain the electric neutrality of the Perovskite compound; said process essentially consisting in a step (a) of electro-deposition of said ceramic active phase on said metallic support. Use of said catalytic specie as a catalyst oxidation of gaseous hydrocarbons, to produce synthesis gas.

12 Claims, 5 Drawing Sheets

Pellet of Hydrotalcite-type precursor Ni/Al (3:1 atomic ratio) deposited on FeCrAlY by electrochemical method (Invention).

U.S. PATENT DOCUMENTS

| | | | |
|---|---|---|---|
| 3,833,386 A * | 9/1974 | Wood et al. | |
| 3,923,696 A * | 12/1975 | Chart et al. | 502/307 |
| 4,021,373 A * | 5/1977 | Kane | 502/316 |
| 4,162,235 A * | 7/1979 | Acres et al. | 502/243 |
| 4,189,405 A * | 2/1980 | Knapton et al. | 502/73 |
| 4,197,217 A * | 4/1980 | Gartshore et al. | |
| 4,410,454 A * | 10/1983 | Faschingbauer | 502/306 |
| 4,522,940 A * | 6/1985 | Sambrook et al. | |
| 4,530,918 A * | 7/1985 | Sambrook et al. | |
| 4,738,946 A * | 4/1988 | Yamashita et al. | |
| 5,232,357 A * | 8/1993 | Dalla Betta et al. | 431/7 |
| 5,318,937 A * | 6/1994 | Jovanovic et al. | |
| 6,238,816 B1 * | 5/2001 | Cable et al. | |
| 6,248,689 B1 * | 6/2001 | Manson | 502/340 |
| 7,166,267 B2 * | 1/2007 | Villa | |
| 7,214,331 B2 * | 5/2007 | Jiang et al. | |
| 7,514,055 B2 * | 4/2009 | Golden | |
| 2002/0042341 A1 * | 4/2002 | Golden | |
| 2003/0185750 A1 * | 10/2003 | Wang et al. | |
| 2004/0157939 A1 * | 8/2004 | Ramani et al. | 518/718 |
| 2005/0067056 A1 * | 3/2005 | Shoji et al. | |

FOREIGN PATENT DOCUMENTS

| | | |
|---|---|---|
| EP | 1484108 | 12/2004 |
| FR | 2763259 | 11/1998 |
| JP | 11138020 | 5/1999 |
| JP | 2005007298 | 1/2005 |
| WO | 2004087312 | 10/2004 |

OTHER PUBLICATIONS

Ballarin B. et al: "Electrodes Modified with an Elextrosynthesised Ni/Al Hydrotalcite as Amperometric Sensors in Flow Systems" Analytica Chimica Acta, Elsevier, Amsterdam, NL, vol. 538, No. 1-2, May 4, 2005, pp. 219-224, XP004863775, ISSN: 0003-2670.

Search Report for PCT/EP2007/050223.

* cited by examiner

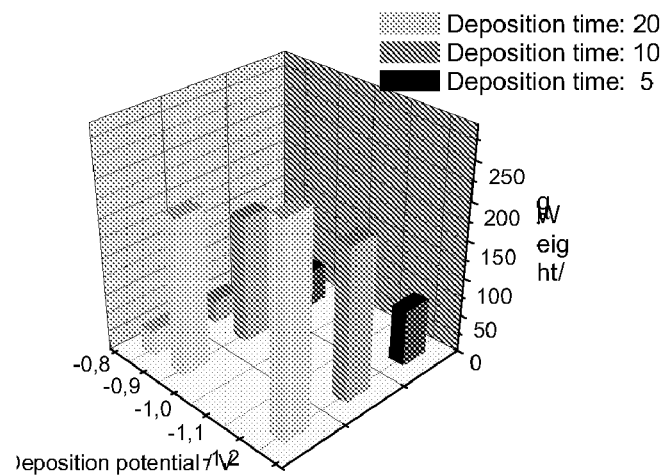
Figure 1 (prior art)
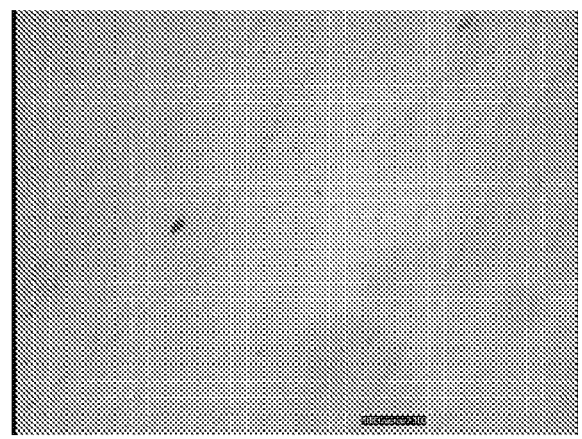
Figure 2: (prior art)

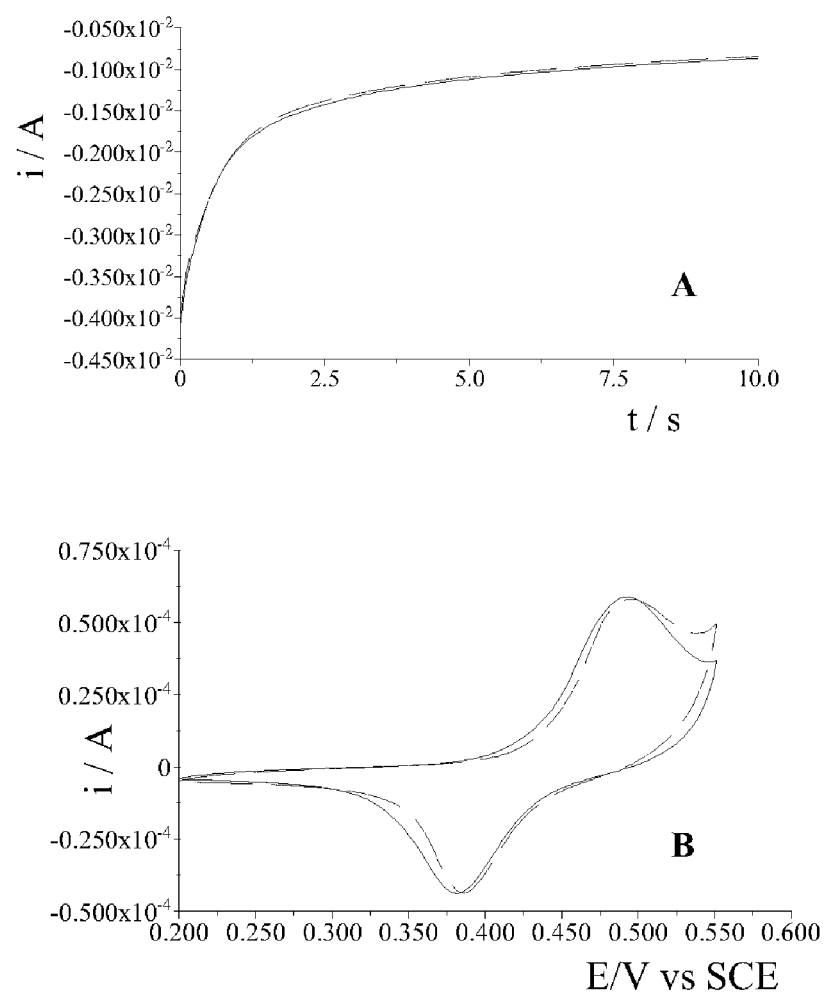
Figure 3A: (prior art)
Figure 3B: (prior art)

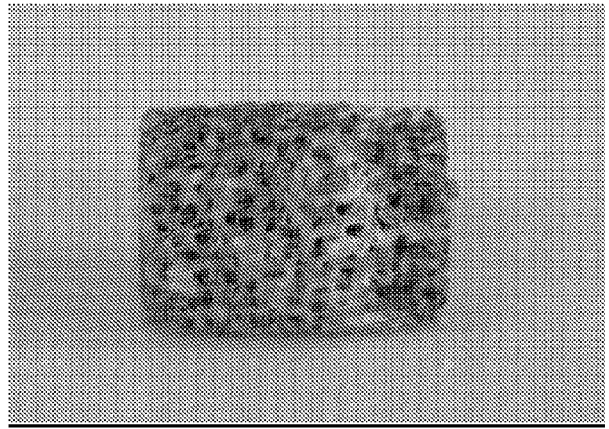
Figure 4: Pellet of Hydrotalcite-type precursor Ni/Al (3:1 atomic ratio) deposited on FeCrAlY by electrochemical method (Invention).
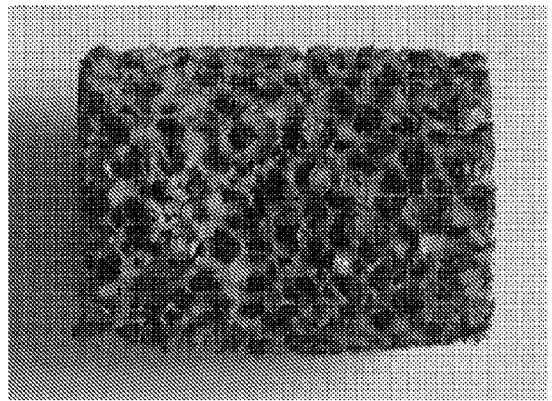
Figure 5: Pellet of Ex-hydrotalcite Ni/Al (3:1 atomic ratio) deposited on FeCrAlY (by electrochemical method) after calcination at 900°C.(Invention)

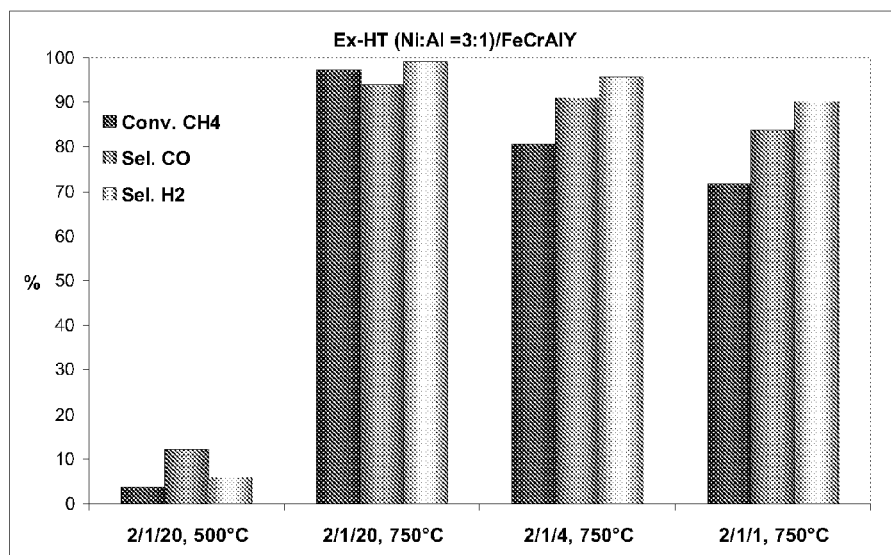

Figure 6: Activity of the ex HT Ni/Al deposited on FeCrAlY (by electrochemical method) in different reaction conditions (Temperatures on the first layer of the monolith: 500 °C for the test at 500 °C (oven temperature as in figure) with the mixture 2/1/20 v/v; 766 °C for the test at 750 °C with the mixture 2/1/20 v/v; 790 °C for the test at 750 °C with the mixture 2/1/4 v/v and 762 for the test at 750 °C with the mixture 2/1/1 v/v) (Invention).

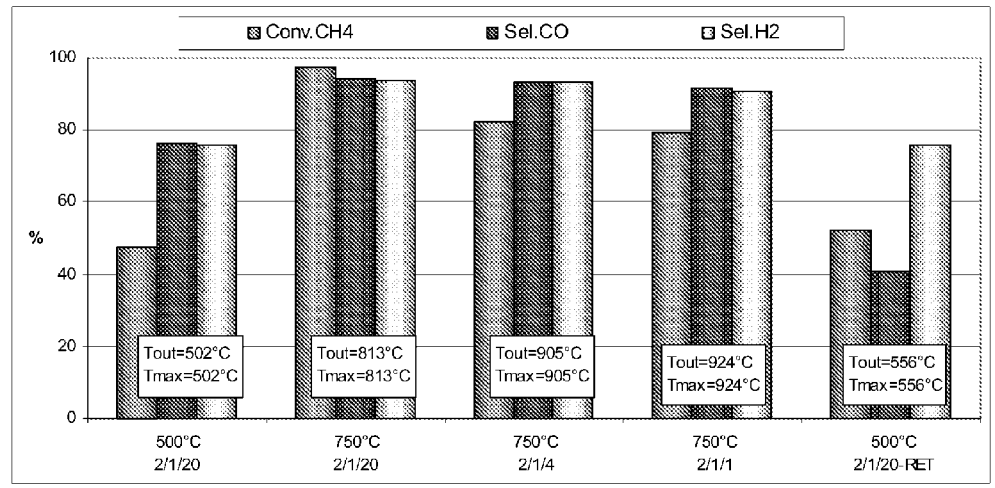
Figure 7: Activity of the ex HT $Ni_8Rh_{0.15}Mg_{60}Al_{31.85}$ deposited on beads of $\alpha$-Al2O3 (Comparison)
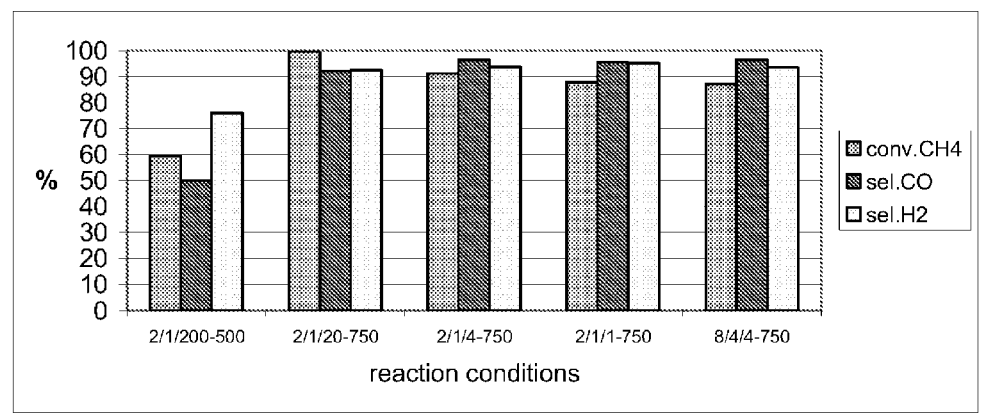
Figure 8: Activity of the 0.1% Rh deposited on beads of a-Al2O3 (Comparison)

PROCESS FOR THE PREPARATION OF A CATALYTIC SPECIE USING ELECTRO-DEPOSITION

This application is a 371 of International PCT Application PCT/EP2007/050223, filed Jan. 10, 2007.

BACKGROUND

The present invention relates to a new family of catalysts for the partial oxidation (CPO) of hydrocarbons, Steam Methane Reforming (SMR), Steam Naphtha Reforming or dry reforming (DR). The catalytic production of synthesis gas is operated under drastic conditions, mainly temperature conditions, which are very often detrimental for the stability of the catalyst. The catalytic partial oxidation of hydrocarbons (CPO) is for example a strong exothermic reaction and the first part of the catalytic bed can reach a temperature up to 1000° C. On the contrary, the steam methane reforming (SMR) and the dry reforming (DR) being endothermic reactions, it is thus necessary to heat up the catalytic bed close to 1000° C. in order to achieve the maximal conversion of the hydrocarbons species and the heat transfer to the catalytic bed must be done very quickly, generally less than one second and preferably less than 0.1 second, to decrease its contact time with the reacting species, in order to limit the carbon formation.

These reactions thus need use very stable catalysts in terms of metal sintering, support chemical, mechanical resistance and particle dispersion.

Furthermore, the activity of the catalyst activity may affect the thermal profile of the reactor: in this respect, it can be stressed that, the catalytic partial oxidation of hydrocarbons (CPO) must be carefully managed to avoid the formation of hot spots in the reactor, which can light on the homogeneous reaction; the endothermic reactions need a lot of energy which is brought by heating device heating the wall of the reactor. The homogeneity of the reaction could thus be facilitated even improved if the catalytic material leads to a good thermal transfer.

Moreover, active catalysts can improve the efficiency of these systems, if they are deposited on a support having a high thermal conductivity. Special and high-temperature resistant alloys typically offer this property The catalytic bed must also induce to the smallest pressure drop, a pressure drop being detrimental to the reaction, while having the lowest bulk density mainly for economical reasons. The best compromise in terms of morphology and of geometry would probably be the use of support of a specified metallic foam kind.

Another key point concerns the method of deposition of the active phase on the support. As the specific surface area of a metallic support is null, a direct standard method of deposition such as the impregnation method, is unsuitable.

Several publications disclose the way of manufacturing supported metal catalysts, which are suitable for the oxidative reforming of hydrocarbons.

Japanese patent 5,186,203 discloses a catalytic element for SMR consisting of nickel fine particles which are impregnated on a porous alumina layer itself linked to the inner surface of a metallic reforming tubes.

Ismagilov et al. (Studies in surface Science and Catalysis, Elsevier, Amsterdam, 2000, Vol. 130 C, 2759) disclosed a catalytic heat-exchanging (HEX) tubular reactor to combining both an exothermic combustion and an endothermic steam reforming of methane, which comprises in the combustion part, a perovskite or Platinum supported catalyst on a Nickel-Chromium foam (Ni—Cr foam) material and in the steam reforming part, a Nickel-containing foam catalyst.

U.S. Pat. No. 6,630,078 B2 discloses the use of a metallic material as a catalytically support for the SMR reaction performed at low contact time value.

US Patent Application US 2003/0,185,750 A1 and International Application WO 02/066,371 disclose, that the active phase (Ni, Rh, Pt, Ru . . . ) is deposited on a ceramic spinel ($Mg$—$Al_2O_3$, $La$—$Al_2O_3$, $Ce$—$Al_2O_3$) even supported on a support standard alumina or on special metallic foam. Such a catalyst is used in SMR reactions, which the contact time required for, is shorter than 1 second.

US Patent Application US 2004/0,157,939 A1 discloses a catalytically active metal which is deposited on a silicon carbide support and used in the catalytic partial oxidation of methane to synthesis gas.

International Application WO 2004/087,312 discloses a simple and effective method for coating the surface of a metallic carrier material with a Ni catalyst, that can be used even if the carrier material has a complicated surface geometry.

US Patent Application US 2005/0,084,441 A1 discloses the preparation of C-nanochips, which are suitable and highly conductive supports for metals or metal oxides from the metals from Groups VIII, IB and IIIB of Periodic Table of Elements, and which may be used in catalytic reactions such as oxidation, hydrogenation, reforming or steam reforming.

Japanese Patent 5,007,298 discloses a porous metal catalyst usable for the steam reforming of hydrocarbons, which can be made by forming a catalyst layer comprising a porous ceramic layer carrying a catalyst powder, which is carried on the surface of a porous metal catalyst carrier having a 3-dimensional reticular structure. A composite ceramic powder formed by coating the ceramic powder with the catalyst powder is then fixed and carried on the surface of the skeleton of the porous metal carrier having the 3-dimensional reticular structure.

The deposition of the active phase is carried out by classical methods such as dip coating, successive wash-coats, organometallic vapor deposition, plasma deposition, or chemical vapor deposition, However, the metallic support must previously be coated by a ceramic layer such as $MgAl_2O_4$, $Al_2O_3$, $Al_2O_3+CeO_2$, SiC $Ca$—$Al_2O_3$, or $La$—$Al_2O_3$, but the coating must have the lowest thickness as possible, in order to create a minimal surface area which is necessary to fix the active phase. The interest of this ceramic coating on the alloy foam is not only to ensure the catalytic active phase dispersion but also to protect the alloy along the time, under industrial conditions from corrosion, metal dusting or oxidation effects. The quality of this coating directly impacts the performances of the material in terms of stability or of catalytic activity and the catalytically active phase is not in direct contact with the metallic support. The known coating techniques cited above are however not easy to be worked on.

The starting point of the work of the inventors are two papers which reported the bulk synthesis of Hydrotalcite compounds containing Co or Ni as bivalent cations and Al as trivalent cations by cathodic reduction of nitrates (L. Indira and P. V. Kamath, J. Mater. Chem. 4 (1994) 1487; Dixit and P. V. Kamath, J, Power Sources 56 (1995) 97]. On this basis, an extensive study has been performed to find the best experimental conditions to modify different electrodes by one-step electro-synthesis of Ni/Al Hydrotalcite (E. Scavetta, B. Ballarin, M. Giorgetti, I. Carpani, F. Cogo and D. Tonelli, J. New Mater. Electrochem. Systems 7 (2004-43), evidencing the key role of time and potential to control the film thickness. FIG. 1 discloses a plot of the film weight as a function of the deposition potential and time (for a Pt electrode). FIG. 2 is an optical microscope photograph of the HT film obtained on a Pt electrode at E=−0.9V and t=10 s which is a very clean and stable film.

FIG. 3A) discloses a plot of the electrical intensity versus time for two different Pt electrodes during the Ni/Al—NO$_3$ Hydrotalcite compound electrosynthesis at E=−0.9 V.

FIG. 3B) discloses the cyclic voltamogramms (20$^{th}$ cycle) in a decimolar aqueous soda solution (0.1 M NaOH) for two electrodes in Platinum modified with Ni/Al—NO$_3$ Hydrotalcite compound which was electro-synthesized in a potentiostatical way at E=−0.9 V for 10 s; potential scan rate=50 mVs$^{-1}$. Both figures evidence the high reproducibility of the technique.

These modified electrodes have been already applied in a flow system for the amperometric determination of sugars and alcohols [B. Ballarin, M. Berrettoni, I. Carpani, E. Scavetta and, D. Tonelli, Anal. Chim. Acta 538 (2005) 219]. Mixed oxides bulk electrosynthesis has also been reported, in particular ferroelectric lead zirconate titanate (PZT) [Zhitomirsky, A. Kohn and L. Gal-Or, Mater. Letters 25 (1995) 223], rare-earth chromates Ln$_2$Cr$_3$O$_{12}$×7H$_2$O (Ln=La, Pr, Nd) [G. H. Annal Therese and P. Vishnu Kamath, Mater. Res. Bulletin 33 (1998) 1] or Ba$_5$Ru$_3$Na$_2$O$_{14}$ 10H-perovskite related structure [E. Quarez and O. Mentré, Solid State Science 5 (2003) 1105.].

The aim of the present invention is thus to propose a new approach which dramatically reduces the number of process steps, by proposing a direct "active dense ceramic coating" on the alloy foam.

BRIEF DESCRIPTION OF THE FIGURES

FIG. 1 discloses a plot of the film weight as a function of the deposition potential and time for a Pt electrode.

FIG. 2 is an optical microscope photograph of a HT film obtained on a Pt electrode.

FIG. 3A discloses a plot of the electrical intensity versus time for two different Pt electrodes during the Ni/Al—NO$_3$ Hydrotalcite compound electrosynthesis.

FIG. 3B discloses the cyclic voltamogramms in a decimolar aqueous soda solution for two electrodes in Platinum modified with Ni/Al—NO$_3$ Hydrotalcite compound which was electro-synthesized in a potentiostatical way.

FIG. 4 discloses pellets covered by a green layer, which is typical of the Ni containing hydrotalcite precursor.

FIG. 5 discloses the obtained pellets calcined at 900° C. for 12 h to form ex HT Ni/Al deposited on FeCrAlY pellets.

FIG. 6 reports the catalytic activity as methane conversion and selectivity values in hydrogen and CO of the ex HT Ni/Al deposited on FeCrAlY by electrochemical method in different reaction conditions.

FIG. 7 reports that results of performances of the sample made by a slurry of ex-HT sil Ni$_8$Rh$_{0.15}$Mg$_{60}$Al$_{31.85}$(calcined at 900° C.) deposited on beads of α-Al$_2$O$_3$ coated with a spheralite.

FIG. 8 reports the CPO performance of a standard catalyst of 0.1% Rh impregnated on a-alumina.

SUMMARY OF THE INVENTION

The present invention provides a process for the preparation of a catalytic specie. The process comprises the electro-deposition of a ceramic active phase layer directly on a metallic support.

According to a first embodiment, the subject-matter of the present invention, is a process for the preparation of a catalytic specie consisting essentially of a metallic support, which is coated with a ceramic active phase layer, said process essentially consisting in a step (a) of electro-deposition of said ceramic active phase on said metallic support.

In the context of the present invention, the words "ceramic active phase layer" is applied to all ceramic phases in which, in the crystallographic structure, noble metals and/or Ni, Co are present. During time on stream, some part of these metallic elements goes outside the crystallographic structure to the surface.

Examples of such ceramic active phase layer include solid solutions of a mixtures of at least a Magnesium oxide type phase compound and at least a Magnesium silicate type phase compound in which Al, and Rh and/or Ni cations are soluted; or solid solutions of a mixture of at least a perovskite cristallographic structure with nickel and/or rhodium metal.

In the context of the present invention, the word "metallic support" is mainly applied to metallic foams which develop a large specific surface and which are stable at a temperature up to 1000° C. Examples of such supports includes metallic foam of FeCrAlY, NiCrAlY. Such a foam may be in the form of pellets or packed which are used to fill the reactor.

In the context of the present invention, the word "electro-deposition" is mainly applied to the synthesis of the above ceramic phases as well controlled and adherent thin layer by electrochemical reactions and following calcination.

According to a particular embodiment, in the process as defined above, the ceramic active phase layer is a compound of the general formula (I):

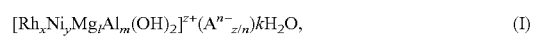
$$[Rh_xNi_yMg_lAl_m(OH)_2]^{z+}(A^{n-}{}_{z/n})kH_2O, \quad (I)$$

wherein A$^{n-}$ is mainly a silicate or a polysilicate anion;
0≦x≦0.3;
0≦y≦0.9;
0≦l≦0.9;
0≦m≦0.5;
0≦k≦10;
x+y>0;
0.5≦y+l≦0.9;
x+y+l+m=1; and
z is the total electrical charge of the cationic element.

As example of compounds of the general formula (I), there are those of the formula (I) as defined above wherein:
0≦x≦0.1;
0≦y≦0.3;
0.3≦l≦0.8;
0.1≦m≦0.4;
0≦k≦5;
x+y>0;
0.6≦y+l≦0.8;
x+y+l+m=1.
and more particularly those compounds chosen from:
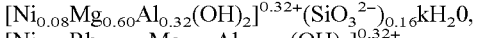
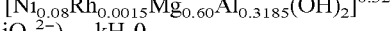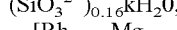
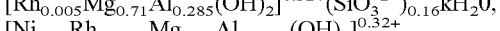
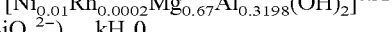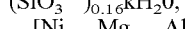
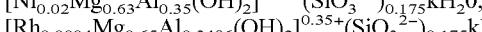
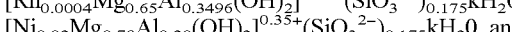
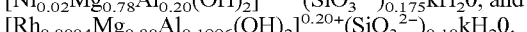
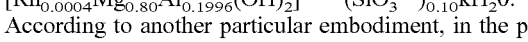
[Ni$_{0.08}$Mg$_{0.60}$Al$_{0.32}$(OH)$_2$]$^{0.32+}$(SiO$_3$$^{2-}$)$_{0.16}$kH$_2$0,
[Ni$_{0.08}$Rh$_{0.0015}$Mg$_{0.60}$Al$_{0.3185}$(OH)$_2$]$^{0.32+}$(SiO$_3$$^{2-}$)$_{0.16}$kH$_2$0,
[Rh$_{0.005}$Mg$_{0.71}$Al$_{0.285}$(OH)$_2$]$^{0.32+}$(SiO$_3$$^{2-}$)$_{0.16}$kH$_2$0,
[Ni$_{0.01}$Rh$_{0.0002}$Mg$_{0.67}$Al$_{0.3198}$(OH)$_2$]$^{0.32+}$(SiO$_3$$^{2-}$)$_{0.16}$kH$_2$0,
[Ni$_{0.02}$Mg$_{0.63}$Al$_{0.35}$(OH)$_2$]$^{0.35+}$(SiO$_3$$^{2-}$)$_{0.175}$kH$_2$0,
[Rh$_{0.0004}$Mg$_{0.65}$Al$_{0.3496}$(OH)$_2$]$^{0.35+}$(SiO$_3$$^{2-}$)$_{0.175}$kH$_2$0,
[Ni$_{0.02}$Mg$_{0.78}$Al$_{0.20}$(OH)$_2$]$^{0.35+}$(SiO$_3$$^{2-}$)$_{0.175}$kH$_2$0, and
[Rh$_{0.0004}$Mg$_{0.80}$Al$_{0.1996}$(OH)$_2$]$^{0.20+}$(SiO$_3$$^{2-}$)$_{0.10}$kH$_2$0.

According to another particular embodiment, in the process as defined above, the ceramic active phase layer is a compound of the general formula (II):

$$[A_zA'_{1-z}][B_{1-x-y}Ni_xRh_y]O_{3-\delta} \quad (II)$$

wherein:

A and A' are different and are selected from the Lanthanide or the Actinide families or from the group $II_a$ of the Mendeleev's periodical table of elements;

B is selected from the transition metal groups of columns IIIb, IVb, Vb, VIb, VIIb, Ib and IIb and group VIIIb of the Mendeleev's periodical table of elements;

$0 \leq x \leq 0.7$,
$0 \leq y \leq 0.5$,
$0 \leq x+y \leq 0.8$,
$0 \leq z \leq 1$ and δ is the sub stoechiometric value of oxygen to obtain the electric neutrality of the Perovskite compound.

As example of compounds of the general formula (II), there are those of the formula (II) as defined above, wherein A and A' are independently chosen from Lanthanum (La), Cerium (Ce), Calcium (Ca) or Strontium (Sr); those of the formula (II) as defined above wherein A is La; or those of the formula (II) as defined above wherein B is chosen from Manganese (Mn), iron (Fe) or cobalt (Co).

According to another particular embodiment, in the process as defined above, the ceramic active phase layer is a compound represented by the formula (IIa):

   (IIa)

wherein A', x, y, and z and δ are as hereinabove defined for the formula (II), or a compound represented by the formula (IIb):

   (IIb)

wherein x, y, and z and δ are as hereinabove defined for the formula (II).

According to another particular embodiment, in the process as defined above, the ceramic active phase layer is a compound represented by the formula (II) wherein $0 \leq x \leq 0.5$; or wherein, $0 \leq y \leq 0.25$.

According to another particular embodiment, in the process as defined above, the ceramic active phase layer is a compound chosen from:

$LaFe_{0.7}Ni_{0.2}Rh_{0.05}O_{3-\delta}$
$La_{0.8}Ce_{0.2}Fe_{0.7}Ni_{0.25}Rh_{0.05}O_{3-\delta}$
$LaFe_{0.7}Ni_{0.3}O_{3-\delta}$
$LaFe_{0.05}Rh_{0.05}O_{3-\delta}$
$La_{0.8}Ce_{0.2}Fe_{0.7}Ni_{0.3}O_{3-\delta}$ The process as defined above, may comprises a calcination step b) of the specie obtained at step a).

According to another embodiment, the subject matter of the present invention is the use of catalytic specie, which is prepared by the process as defined above, as a catalyst oxidation of gaseous hydrocarbons, to produce synthesis gas.

According to a last embodiment, the subject matter of the present invention is a process of production of synthesis gas by oxidating a stream of gaseous hydrocarbons in the presence of the catalytic specie, which is prepared by the process as defined above.

The advantages of process for the preparation of the catalytic specie as defined above, are the direct deposition of the "active ceramic catalyst" on the metallic support, the possibility to control the thickness of the deposited layer, the obtaining of an homogeneous layer when using nominal operating conditions and the simplification of the manufacturing process.

The following description is an illustration of the claimed process without limiting it.

EXPERIMENTAL REPORT

Introduction

In the present preparations, reagent grade purity chemicals have been employed; the Ni/Al Hydrotalcite compound was electro-synthesized starting from freshly prepared solution of Ni and Al nitrates in doubly distilled water. Two thin copper wires inserted inside the porous pellet performed the electrical contact on a single pellet of metallic foam of FeCrAlY, sold by PORVAIR (USA).

A thin film of Ni/Al Hydrotalcite compound was deposited on the pellet surface by cathodic reduction of an aqueous solution containing 0.225 M of Nickel nitrate [$Ni(NO_3)_2$], 0.075 M Aluminum nitrate [$Al(NO_3)_3$] and 0.3 M Potassium nitrate [$K(NO_3)$]. The electrochemical reaction was carried out at constant potential in the cathodic chamber of a H-form cell at the potential of −1.2 V versus saturated calomel electrode (SCE) for different deposition times (from 30 to 1000 s).

Results a) A test of electrochemical deposition of a Ni/Al Hydrotalcite on a FeCrAlY foam was made with a time of deposition of 1000 s. The pellets were covered by a green layer, which is typical of the Ni containing hydrotalcite precursor (as shown in FIG. 4), even if the global appearance of the pellet was not homogeneous. This is probably due to the fact that the electrodes have been connected at one side of the foam.

b) The obtained pellets were calcined at 900° C. for 12 h (as shown on FIG. 5), to form ex HT Ni/Al deposited on FeCrAlY pellets and reduced in $H_2/N_2$ flow at 750° C.

c) The sample was tested in a CPO laboratory pilot, in order to evaluate its activities.

FIG. 6 reports the catalytic activity as methane conversion ($CH_4$ conv.) and selectivity values in hydrogen (sel. $H_2$) and CO (sel. CO) of the ex HT Ni/Al deposited on FeCrAlY (by electrochemical method) in different reaction conditions (Temperatures on the first layer of the monolith: 500° C. for the test at an oven temperature of 500° C. with the mixture $CH_4/O_2/He=2/1/20$ v/v; 766° C. for the test at an oven temperature of 750° C. with the mixture $CH_4/O_2/He=2/1/20$ v/v; 790° C. for the test at an oven temperature of 750° C. with the mixture $CH_4/O_2/He=2/1/4$ v/v and 762 for the test at an oven temperature of 750° C. with the mixture $CH_4/O_2/He=2/1/1$ v/v).

The sample is not active at 500° C. and using the $CH_4/O_2/He=2/1/20$ v/v mixture (far from thermodynamic conditions), but increasing the oven temperature at 750° C., the activity increases. The activities at 750° C. of different feedings ($CH_4/O_2/He=2/1/20, 2/1/4$ and $2/1/1$ v/v) were comparable to that of the sample ex-HT $Ni_{0.02}Mg_{0.63}Al_{0.35}$ (best formulation obtained during the previous CPO study) and to classical catalysts (0.1 wt. % Rh on $Al_2O_3$).

d) The performances of the Hydrotalcite supported on alloy foam are compared to:

1- the best sample (optimized formulation) made by a slurry of ex-HT sil $Ni_8Rh_{0.15}Mg_{60}Al_{31.85}$ (calcined at 900° C.) deposited on beads of α-$Al_2O_3$ coated with a spheralite/Disperal and tested previously during the CPO study. The results of performances are reported on FIG. 7.

2- a standard catalyst of 0.1% Rh impregnated on a-alumina. The CPO performances are reported on FIG. 8.

The performances of a non optimized hydrotalcite deposited by electrochemical method on a metallic foam are close to those of the best sample of Hydrotalcite deposited on alumina by a standard method, or close to those of a standard commercial catalyst constituted of 0.1% Rh on a-alumina. These performances would certainly be improved by means of an optimized hydrotalcite deposited by electrochemical method on a metallic foam.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A process for the preparation of a catalytic specie, said process comprising the electro-deposition of a ceramic active phase layer directly on a metallic support, the ceramic active phase layer comprising a compound of the general formula (I):

$$[Rh_xNi_yMg_lAl_m(OH)_2]^{z+}(A^{n-}_{z/n})kH_2O, \quad (I)$$

wherein $A^{n-}$ is mainly a silicate or a polysilicate anion;
$0 \leq x \leq 0.3$;
$0 \leq y \leq 0.9$;
$0 \leq l \leq 0.9$;
$0 \leq m \leq 0.5$;
$0 \leq k \leq 10$;
$x+y>0$;
$0.5 \leq y+l \leq 0.9$;
$x+y+l+m=1$; and z is the total electrical charge of the cationic element; and the metallic support being selected from the group consisting of metallic foams which are stable at a temperature up to 1000° C.

2. The process of claim 1, wherein the ceramic active phase layer is a compound of the general formula (I) wherein:
$0 \leq x \leq 0.1$;
$0 \leq y \leq 0.3$;
$0.3 \leq l \leq 0.8$;
$0.1 \leq m \leq 0.4$;
$0 \leq k \leq 5$;
$x+y>0$;
$0.6 \leq y+l \leq 0.8$;
$x+y+l+m=1$.

3. The process of claim 2, wherein the ceramic active phase layer is a compound selected from the group consisting of:
$[Ni_{0.08}Mg_{0.60}Al_{0.32}(OH)_2]^{0.32+}(SiO_3^{2-})_{0.16}kH_2O$,
$[Ni_{0.08}Rh_{0.0015}Mg_{0.60}Al_{0.3185}(OH)_2]^{0.32+}(SiO_3^{2-})_{0.16}kH_2O$,
$[Rh_{0.005}Mg_{0.71}Al_{0.285}(OH)_2]^{0.32+}(SiO_3^{2-})0.16kH_2O$,
$[Ni_{0.01}Rh_{0.0002}Mg_{0.67}Al_{0.3198}(OH)_2]^{0.32+}(SiO_3^{2-})_{0.16}kH_2O$,
$[Ni_{0.02}Mg_{0.63}Al_{0.35}(OH)_2]^{0.35+}(SiO_3^{2-})_{0.175}kH_2O$,
$[Rh_{0.0004}Mg_{0.65}Al_{0.3496}(OH)_2]^{0.35+}(SiO_3^{2-})_{0.175}kH_2O$,
$[Ni_{0.02}Mg_{0.78}Al_{0.20}(OH)_2]^{0.35+}(SiO_3^{2-})_{0.175}kH_2O$, and
$[Rh_{0.0004}Mg_{0.80}Al_{0.1996}(OH)_2]^{0.20+}(SiO_3^{2-})_{0.10}kH_2O$.

4. The process of claim 1, wherein the process further comprises a calcination step.

5. The process of claim 1, wherein the process further comprises a calcination step.

6. A process for the preparation of a catalytic specie, said process comprising the electro-deposition of a ceramic active phase layer directly on a metallic support, the ceramic active phase layer comprising a compound of the general formula (I):

$$[Rh_xNi_yMg_lAl_m(OH)_2]^{z+}(A^{n-}_{z/n})kH_2O, \quad (I)$$

wherein $A^{n-}$ is mainly a silicate or a polysilicate anion;
$0 \leq x \leq 0.3$;
$0 \leq y \leq 0.9$;
$0 \leq l \leq 0.9$;
$0 \leq m \leq 0.5$;
$0 \leq k \leq 10$;
$x+y>0$;
$0.5 \leq y+l \leq 0.9$;
$x+y+l+m=1$; and z is the total electrical charge of the cationic element; and the metallic support being selected from the group consisting of metallic foams of FeCrAlY and the metallic foam of NiCrAlY.

7. The process of claim 6, wherein the ceramic active phase layer is a compound of the general formula (I) wherein:
$0 \leq x \leq 0.1$;
$0 \leq y \leq 0.3$;
$0.3 \leq l \leq 0.8$;
$0.1 \leq m \leq 0.4$;
$0 \leq k \leq 5$;
$x+y>0$;
$0.6 \leq y+l \leq 0.8$;
$x+y+l+m=1$.

8. The process of claim 7, wherein the ceramic active phase layer is a compound selected from the group consisting of:
$[Ni_{0.08}Mg_{0.60}Al_{0.32}(OH)_2]^{0.32+}(SiO_3^{2-})_{0.16}kH_2O$,
$[Ni_{0.08}Rh_{0.0015}Mg_{0.60}Al_{0.3185}(OH)_2]^{0.32+}(SiO_3^{2-})_{0.16}kH_2O$,
$[Rh_{0.005}Mg_{0.71}Al_{0.285}(OH)_2]^{0.32+}(SiO_3^{2-})0.16kH_2O$,
$[Ni_{0.01}Rh_{0.0002}Mg_{0.67}Al_{0.3198}(OH)_2]^{0.32+}(SiO_3^{2-})_{0.16}kH_2O$,
$[Ni_{0.02}Mg_{0.63}Al_{0.35}(OH)_2]^{0.35+}(SiO_3^{2-})_{0.175}kH_2O$,
$[Rh_{0.0004}Mg_{0.65}Al_{0.3496}(OH)_2]^{0.35+}(SiO_3^{2-})_{0.175}kH_2O$,
$[Ni_{0.02}Mg_{0.78}Al_{0.20}(OH)_2]^{0.35+}(SiO_3^{2-})_{0.175}kH_2O$, and
$[Rh_{0.0004}Mg_{0.80}Al_{0.1996}(OH)_2]^{0.20+}(SiO_3^{2-})_{0.10}kH_2O$.

9. A process for the production of a synthesis gas, said process comprising oxidizing a stream of gaseous hydrocarbons in the presence of catalytic specie that comprises a ceramic active phase that is directly electro-deposed on a metallic support, the ceramic active phase layer comprising a compound of the general formula (I):

$$[Rh_xNi_yMg_lAl_m(OH)_2]^{z+}(A^{n-}_{z/n})kH_2O, \quad (I)$$

wherein $A^{n-}$ is mainly a silicate or a polysilicate anion;
$0 \leq x \leq 0.3$;
$0 \leq y \leq 0.9$;
$0 \leq l \leq 0.9$;
$0 \leq m \leq 0.5$;
$0 \leq k \leq 10$;
$x+y>0$;
$0.5 \leq y+l \leq 0.9$;
$x+y+l+m=1$; and z is the total electrical charge of the cationic element; and the metallic support being selected from the group consisting of metallic foams which are stable at a temperature up to 1000° C.

10. The process of claim 9, wherein the process further comprises a calcination step.

11. A process for the production of a synthesis gas, said process comprising oxidizing a stream of gaseous hydrocarbons in the presence of catalytic specie that comprises a ceramic active phase that is directly electro-deposed on a metallic support, the ceramic active phase layer comprising a compound of the general formula (I):

$$[Rh_xNi_yMg_lAl_m(OH)_2]^{z+}(A^{n-}_{z/n})kH_2O, \quad (I)$$

wherein $A^{n-}$ is mainly a silicate or a polysilicate anion;
$0 \leq x \leq 0.3$;
$0 \leq y \leq 0.9$;
$0 \leq l \leq 0.9$;
$0 \leq m \leq 0.5$;
$0 \leq k \leq 10$;
$x+y>0$;
$0.5 \leq y+l \leq 0.9$;
$x+y+l+m=1$; and z is the total electrical charge of the cationic element; and the metallic support being selected from the group consisting of the metallic foam of FeCrA and metallic foam of NiCrAlY.

12. The process of claim 11, wherein the process further comprises a calcination step.

* * * * *